US007677720B2

(12) United States Patent
Vincent et al.

(10) Patent No.: US 7,677,720 B2
(45) Date of Patent: Mar. 16, 2010

(54) CHEMICALLY-MODIFIED COATINGS FOR ENHANCED PERFORMANCE OF INK-JET IMAGES

(75) Inventors: Kent D. Vincent, Cupertino, CA (US); Sivapackia Ganapathiappan, Los Altos, CA (US); Sean Xiao-An Zhang, Sunnyvale, CA (US); Palitha Wickramanayake, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1088 days.

(21) Appl. No.: 11/196,370

(22) Filed: Aug. 2, 2005

(65) Prior Publication Data

US 2005/0270350 A1 Dec. 8, 2005

Related U.S. Application Data

(60) Division of application No. 10/632,005, filed on Jul. 30, 2003, now Pat. No. 6,951,672, and a continuation-in-part of application No. 10/096,981, filed on Mar. 12, 2002, now abandoned.

(51) Int. Cl.
*B41J 2/01* (2006.01)

(52) U.S. Cl. .................................................... 347/105

(58) Field of Classification Search ............... 428/32.13
See application file for complete search history.

(56) References Cited

U.S. PATENT DOCUMENTS 3,982,944 A * 9/1976 Ohi et al. .................... 430/644
4,195,010 A * 3/1980 Russell et al. ............... 523/203
4,714,769 A 12/1987 De Antoniis et al.
4,946,557 A 8/1990 Svending
5,179,213 A 1/1993 Bradshaw et al.
5,224,972 A * 7/1993 Frye et al. ........................ 95/9
5,264,275 A 11/1993 Misuda et al.
5,275,867 A 1/1994 Misuda et al.
5,368,833 A 11/1994 Johansson et al.
5,393,892 A 2/1995 Krakowiak et al.
5,463,178 A 10/1995 Suzuki et al.
5,547,760 A 8/1996 Tarbet et al.
5,643,414 A 7/1997 Johansson et al.
5,702,804 A * 12/1997 Malhotra ................ 428/32.13
5,707,493 A 1/1998 Saastamoinen
5,804,293 A * 9/1998 Nehmsmann et al. .... 428/307.3
5,858,280 A 1/1999 Zhang et al.
5,902,516 A * 5/1999 Inui et al. ............. 252/400.22
5,965,244 A 10/1999 Tang et al.
5,985,425 A * 11/1999 Tomizawa et al. ........... 428/212
6,103,380 A * 8/2000 Devonport .................. 428/403

(Continued)

FOREIGN PATENT DOCUMENTS

EP 679700 11/1995

(Continued)

*Primary Examiner*—Stephen D Meier
*Assistant Examiner*—Alexander C Witkowski

(57) ABSTRACT

Ceramic pigment-based, chemically-modified porous coatings can be used for enhancing image permanence of ink-jet image printing. Specifically, a porous coated media sheet, comprising a media substrate, having a porous coating coated thereon comprising a modified ceramic pigment including a fixer group and a stabilizer group, each covalently attached to the ceramic pigment is disclosed. Additionally, a method and system for preparing permanent ink-jet images is also provided.

16 Claims, 1 Drawing Sheet

U.S. PATENT DOCUMENTS

| | | | | |
|---|---|---|---|---|
| 6,110,601 | A | 8/2000 | Shaw-Klein et al. | |
| 6,126,280 | A | 10/2000 | Hashimoto et al. | |
| 6,147,156 | A * | 11/2000 | Yamaya et al. | 524/806 |
| 6,183,844 | B1 | 2/2001 | Li | |
| 6,265,483 | B1 * | 7/2001 | Guilard et al. | 525/69 |
| 6,337,358 | B1 * | 1/2002 | Whitehouse et al. | 523/200 |
| 6,350,519 | B1 * | 2/2002 | Devonport | 428/403 |
| 6,783,819 | B2 * | 8/2004 | Deardurff et al. | 428/32.36 |
| 2002/0032269 | A1 * | 3/2002 | Schobe et al. | 524/492 |
| 2002/0045035 | A1 * | 4/2002 | Nojima et al. | 428/195 |
| 2003/0050424 | A1 * | 3/2003 | Bernard | 528/49 |

FOREIGN PATENT DOCUMENTS

| | | | |
|---|---|---|---|
| EP | 0716929 | A1 | 6/1996 |
| EP | 0 827 842 | A1 | 3/1998 |
| EP | 0937582 | A1 | 8/1999 |
| EP | 1 262 455 | A1 | 12/2002 |
| EP | 1 352 757 | A2 | 10/2003 |
| JP | 2001-158165 | | 6/2001 |

* cited by examiner

CHEMICALLY-MODIFIED COATINGS FOR ENHANCED PERFORMANCE OF INK-JET IMAGES

This is a division of application Ser. No. 10/632,005 filed Jul. 30, 2003 now U.S. Pat. No. 6,951,672.

The present application is a continuation-in-part of U.S. patent application Ser. No. 10/096,981, filed on Mar. 12, 2002, now abandoned titled "Chemically-Bonded Porous Coatings That Enhance Humid Fastness And Fade Fastness Performance Of Ink Jet Images".

FIELD OF THE INVENTION

The present invention relates generally to ink-jet printing. More particularly, the present invention relates to ink-jet print media, systems, and methods for enhancing ink-jet print quality and permanence.

BACKGROUND OF THE INVENTION

Image fade, which includes light and ambient air fade, has been recognized as a significant problem to overcome in the ink-jet printing arts. One prior solution to this problem has involved the inclusion of image fade additives to ink-jet ink used to create the image. However, this approach has complicated the ink-jet ink and has lead to undesired results. For example, inclusion of such additives has often reduced the reliability of ink-jet pens containing these modified ink-jet inks. In addition, stabilizer additives and dyes tend to separate, vitiating the ability of the stabilizer to stabilize the dye.

Another prior solution has involved the inclusion of an additive into or onto a media coating material, such as those used to coat paper. The coatings typically comprise submicron-sized ceramic pigment particles, such as silica or alumina, held in a polymeric binder, such as polyvinyl alcohol. Though not required, the weight ratio of pigments to binder can be on the order of about 15:1 to allow interstitial nanopores within the pigment to be open for water absorption. As ink strikes the coating surface, the ink vehicle is rapidly drawn into the interstitial spaces, through meniscus forces, pulling moisture away from the surface and into the media. Dye is typically adsorbed on the ceramic pigment or the binder surface, allowing optimal print color density and image quality. The porous surface adsorbed dye, however, has the aforementioned shortcomings of poor photo-oxidative color stability and moisture resistance. Depending on the colorant, this degradation may be accelerated further by colorant contact with ceramic pigments. With this in mind, within the ink-jet industry, there is a great desire to find a photo-permanent ink-jet ink print solution for porous media applications.

SUMMARY OF THE INVENTION

In accordance with the present invention, a method of enhancing image permanence of ink-jet images printed on ink-jet media is provided. The method can comprise the steps of (a) modifying a surface of a ceramic pigment with a modifying group selected from the group consisting of a fixer group, a stabilizer group, and combinations thereof; (b) coating a media substrate with the ceramic pigment to form a coated media substrate; and (c) ink-jetting an ink-jet ink in the form of an image on the coated media substrate, wherein a composition within the ink-jet ink is interactive with the modifying group, thereby providing enhanced image permanence.

In another embodiment, a system for producing permanent ink-jet ink images can comprise a (a) a media substrate having a porous coating coated thereon, said porous coating comprising a modified ceramic pigment; and (b) an ink-jet ink comprising a composition configured for interacting with the modifying group of the modified ceramic pigment upon printing the ink-jet ink onto the porous coating.

In still another embodiment, a porous coated media sheet can comprise (a) a media substrate, having coated thereon, (b) a porous coating, comprising a modified ceramic pigment including a fixer group and a stabilizer group, each covalently attached to the ceramic pigment.

BRIEF DESCRIPTION OF THE DRAWINGS

Features and advantages of embodiments of the present disclosure will become apparent by reference to the following detailed description and drawings, in which.

DETAILED DESCRIPTION

Figure 1:
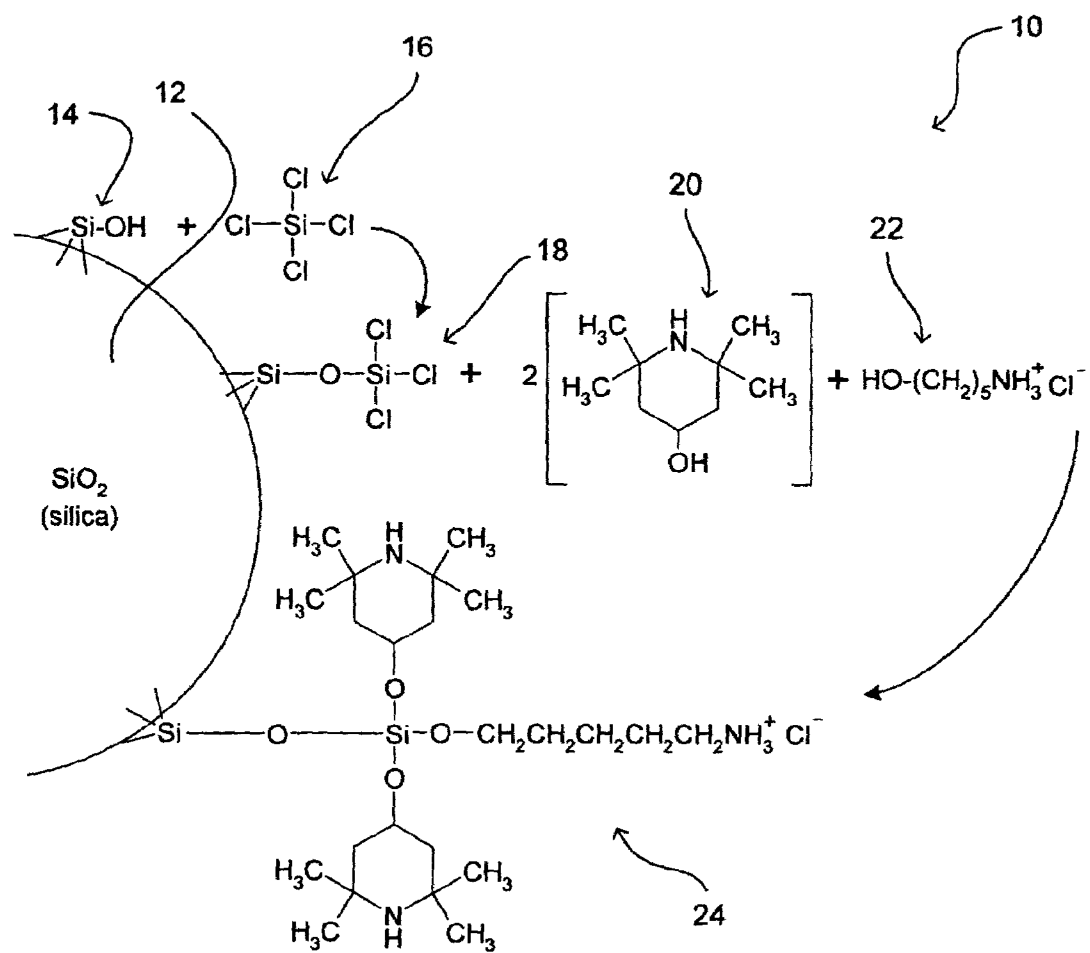
FIG. 1 is a schematic view of an embodiment of a ceramic pigment modified by a fixer group and a stabilizer group.

Before the present invention is disclosed and described, it is to be understood that this invention is not limited to the particular process steps and/or materials disclosed herein, as such process steps and materials may vary in certain embodiments. It is also to be understood that the terminology used herein is used for the purpose of describing particular embodiments only. The terms are not intended to be limiting because the scope of the present invention is intended to be limited only by the appended claims and equivalents thereof.

It is noted that, as used in this specification and the appended claims, the singular forms "a," "an," and "the" include plural referents unless the content clearly dictates otherwise.

"Image permanence" refers to characteristics of an ink-jet printed image that relate to the ability of the image to last over a period of time. Characteristics of image permanence include image fade, water fastness, humid fastness, light fastness, smudge resistance, air pollution induced fading, scratch and rub resistance, and inhibition of microbial growth.

"Media substrate" or "substrate" includes any substrate that can be used in the ink-jet printing arts including papers, overhead projector plastics, coated papers, fabric, art papers (e.g. water color paper), and the like.

"Ceramic pigments" include micron-sized to nano-sized aggregate inorganic particulates such as silica and alumina, titania, zirconia, or can include organo-metallic materials. Ceramic pigments can also comprise aerogels of ceramic particles.

"Modifying group" in the context of the present invention includes either a fixer group or a stabilizer group.

"Stabilizer group" in the context of the present invention includes free radical quenchers, anti-oxidants, anti-ozonants, and photon energy absorbers. Stabilizer groups suitable for the present invention have both a stabilizing functional moiety and a bonding moiety for chemical attachment or tethering to a pigment surface. The stabilizing functional moiety can act to stabilize a dye of an ink-jet ink over time.

"Fixer group" includes compositions that have an opposite charge with respect to a composition present in an ink-jet ink, such as a dye composition. Typically, as most dyes are water dispersed or solubilzed through attached anionic groups, e.g., typically from sulfonate and carboxylate groups, cationic fixers are preferred. However, if a cationic dye is present, then anionic fixers can be used. Fixer groups suitable for the present invention have both a charged moiety and a bonding moiety for chemical attachment or tethering to a pigment surface.

The term "spacer group" refers to intermediate groups or tethering agents, such as silanes, siloxanes, or other known couplers, that can be used to attach fixer groups and/or stabilizer groups to a ceramic pigment. Spacer groups are not required, as properly configured ceramic pigments and modifying groups can be attached directly to one another. If a spacer group is present, the group can include an organic chain that provides appropriate space between a ceramic pigment and an active modifying group, as is generally known in the art. Whether such an organic chain is considered part of the modifying group, or part of the spacer group is not important, as in certain circumstances, either or both characterizations can be considered true.

It has been discovered that certain classes of compositions have a positive influence on dye-stability when ink-jet inks containing these dyes are printed on porous media. These classes of composition, or modifying groups, can have a stabilizing effect or a fixing effect on inkjet inks. Classes include phenols and substituted phenols; primary, secondary, and tertiary aromatic and aliphatic amines; polyamines; alcohols, polyols, sugars and their derivatives; hydroxylamines, hydrazines, and amine-oxides; amides, urea, and polyamides; amino acids; hydroxy acids; thiocyanide; and heterocyclic compounds having nitrogen and/or sulfur as hetero atoms in the ring. Examples of such heterocyclic compounds include pyrroles, thiophenes, imidazoles, thiozoles, pyrazoles, pyrrolines, pyrrolidines, pyridines, pyrimidines, purines, quinolines, isoquinolines, carbazoles, and their derivatives. While these compounds in small concentration (1.5%) significantly enhance dye-stability in ink-jet produced images in cast films, they provide little influence when included directly in an ink-jet ink or when merely mixed with a media coating. This is believed to be because these compounds and the dye can dissociate chromatigraphically upon printing, and likewise, these compounds do not associate with the media coatings in a desirable manner.

The present invention overcomes the foregoing compound and dye association problems by covalently attaching these compounds as a modifying group to a ceramic pigment surface on which the dye is otherwise adsorbed upon printing. The modified ceramic surface also serves to pacify the ceramic surface against photo-catalytic fade otherwise induced by association of the dye with the ceramic metal oxide.

As mentioned, the modifying group attached to the ceramic surface can act as an ink- or dye-stabilizer, as an ink- or dye-fixer, or as both. An attached fixer can enhance print optical density and print quality through more rapid immobilization of the printed dye on the pigment surface, as well as enhance waterfastness and humid bleed control through the ionic bond produced between the fixer group and dye counterions. An attached stabilizer group can impart properties of a free radical quencher, an anti-oxidant, an anti-ozonant, and/or a photon energy absorber. Alternatively, multiple modifying groups can be attached to a common pigment surface, wherein at least one of which is an ink- or dye-fixer and at least one of which is an ink- or dye-stabilizer.

The ceramic pigments for use in ink-jet porous media coatings are well known and most commonly comprise from micron- to nano-sized aggregates of silica, alumina, titania, or zirconia. Ceramic pigments may alternately comprise organo-metallics, or may be composed of aerogels of ceramic particles. While non-ceramic particles can also be modified by stabilizer groups or fixer groups, ceramic pigments generally have the desired attributes of high surface energy, whiteness, and porosity that provides for the best water draw and dye absorption for ink-jet applications. For the purposes of the present invention, the ceramic pigment preferably has surface groups, such as silanol groups (which includes an —OH group) in the case of silica, or hydroxyl in the case of alumina, that allow grafting of desired stabilizer groups and/or fixer groups chemistries to the ceramic surfaces. The concentration of such surface groups is controlled by the particle manufacturing process. An example of a ceramic pigment suitable for the present invention include silicas manufactured by Degussa (e.g. Aerosis) and Cabot (Cabosils) corporations.

With respect to the attachment of a fixer group to a ceramic pigment, the fixer group compositions can be configured to have an opposite charge with respect to a dye composition that can be present in an ink-jet ink. Typically, as most dyes are water dispersed or dissolved through attached anionic groups, e.g., typically from sulfonate and carboxylate groups, cationic fixers are preferred for use. Amine and alkali earth metal salts can be used, with amine and polyamine salts being preferred salts for use with the present invention. Primary, secondary, and tertiary amine salts and quaternary ammonium salts are also satisfactory cationic fixer groups for use with the present invention. If a cationic dye is used, then anionic fixers can be readily obtained through the salts of organic acids, such as carboxylates and sulfonates. As mentioned, fixer groups suitable for the present invention have both a charged moiety and a bonding moiety for chemical attachment or tethering to a pigment surface.

With specific reference to the attachment of stabilizer groups to ceramic pigments for use in a media coating, a number of classes of stabilizer-containing functional groups that are effective in photo-stabilizing common ink-jet dyes have been identified. In each case, the discovered stabilizer function involves one or more atoms having an unshared pair of electrons, such as nitrogen, oxygen, or sulfur. Phosphorus, selenium and iodine atoms likewise show stabilizer functionality. Compounds containing these atoms, however, typically have toxicity or color issues that are not conducive to ink-jet print applications. For example, iodine compounds tend to have a brownish color that is incompatible with inclusion in a paper-white media. While the general teachings of the present invention include stabilizer groups containing these latter atoms, they are less preferred. However, to the extent that these type of stabilizer groups are functional for a specific application, such as for printing on colored paper and the like, they are included. More preferably, several classes of nitrogen-, oxygen- and sulfur-containing stabilizer groups having various functional groups are provided herein. Such stabilizer groups can include phenols and substituted phenols, amines, alcohols, polyols, sugars and their derivatives, hydroxyamines, amine-oxides and sulfur containing inorganic salts, amides, polyamides and urea, heterocyclics having nitrogen and/or sulfur heteroatoms in the ring, organic acids such as ascorbic acid, etc.

With respect to phenols and substituted phenols, this class includes, but is not limited to, alkylated monophenols, alkylthiomethylphenols, hydroquinones and alkylated hydroquinones, tocopherols, phenol esters, phenol acids, and their derivatives. Particularly effective stabilizer groups within this class are esters of 4-hydroxy benzoic acid. In general, the phenol stabilization function appears to increase as electrons are withdrawn at the para position to the hydroxyl group.

With specific reference to amine functional group-containing stabilizer groups, this class includes primary, secondary, and tertiary aliphatic and aromatic amines, as well as polyamines. In general, amine stabilizer group potency tends to increase with nucleophilicity. Sterically hindered amines are particularly effective photo-stabilizers because the amine is not consumed as a result of free radical quenching. Di-tert-butyl amine is an example of such a hindered secondary amine stabilizer group. Polyethylenimine is an example of a polyamine stabilizer group.

Alcohols, polyols, sugars, and their derivatives provide other functional groups that can be present in stabilizer groups of the present invention. Polyvinyl alcohol and sugars, such as dextrose, can be particularly effective in photo-stabilizing dyes.

Nitrogen- and/or sulfur-containing heterocyclic groups can also be effective as constituents of stabilizer groups. This class of stabilizer group includes, but is not limited to, pyrroles, thiophenes, imidazoles, thiozoles, pyrazoles, pyrrolines, pyrrolidines, piperidines, pyridines, pyrimidines, purines, quinolines, isoquinolines, triazines, carbazoles, and derivatives thereof. A particularly effective photo-stabilizer group within this class are the cyclic hindered amines, such as 2,2,6,6 tetramethylpiperidine, 3,5-diamino-1,2,4-triazole, and the like. Cyclic hindered amines provide an effective heterocyclic stabilizer containing both multiple heterocyclic nitrogens and primary amines. Melamine and certain reaction products of cyanuric chloride are also effective dye stabilizing groups.

As stated above, other stabilizer groups having various moieties can also be effective: Such groups can include hydroxyamines, amine-oxides and sulfur-containing inorganic salts, amides, polyamides, urea, and organic acids such as ascorbic acid. Urea is a particularly potent stabilizer group.

The scope of the present invention includes these and other stabilizer groups having known photo-stabilizer functional groups. U.S. Pat. No. 5,772,921, which is incorporated herein by reference, includes a list of known photo-stabilizers that is exemplary of the type of groups that can be used. One skilled in the art will readily recognize that many compounds contain these photo-stabilizer functional groups and, further, that many of such compounds either contain an additional bonding group or groups or can be modified to have such additional bonding capability. For example, 2,2,6,6-tetramethyl-4-piperidinol (Aldrich) comprises both the very potent 2,2,6,6-tetramethylpiperidine photo-stabilizer functional group and a secondary alcohol bonding group. When bonding a fixer group and/or a stabilizer group to a ceramic pigment in accordance with the present invention, silanes and siloxanes provide coupling means that are particularly well suited for covalent linkage. Exemplary reactions are provided that use a silane and a siloxane in Formulas 1 and 2, respectively, below:

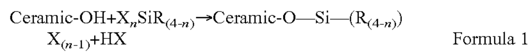

$$\text{Ceramic-OH}+X_nSiR_{(4-n)}\rightarrow\text{Ceramic-O—Si—}(R_{(4-n)})X_{(n-1)}+HX \quad \text{Formula 1}$$

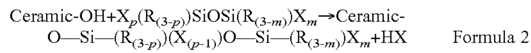

$$\text{Ceramic-OH}+X_p(R_{(3-p)})SiOSi(R_{(3-m)})X_m\rightarrow\text{Ceramic-O—Si—}(R_{(3-p)})(X_{(p-1)})\text{O—Si—}(R_{(3-m)})X_m+HX \quad \text{Formula 2}$$

where Ceramic-OH is a ceramic pigment having surface silanols or hydroxyls (such as with silica, alumina, titania, or zirconia), X is a hydrolyzable group, e.g. halo, alkoxy; n is 1, 2 or 3; p is 1 or 2; m is 1 or 2; and R is a non-hydrolyzable group, wherein at least one R must contain or be reactive with a fixer group or a stabilizer group. While not shown in the equation, the R group can typically be formed before or after silane or siloxane attachment to the ceramic pigment surface, and may optionally (and most often) be bonded into the silane or siloxane through hydrolysis of one of the hydrolyzable X groups. Thus, the starting silane or siloxane for such a reaction can include compositions wherein n is 4, p is 3, and m is 3. In most commercial embodiments, the hydrolyzable X group can be halogen, e.g., chlorine, or alkoxy, e.g., methoxy or ethoxy. The X group can typically be hydrolyzed by protic reactants, such as alcohols, carboxylic acids, or amines. Such protic reactants can provide a preferred bonding group for attaching a stabilizer group and/or a fixer group to the silane or siloxane spacer or coupler. A wide range of silanes and siloxanes are offered commercially, e.g. Dow Corning, that are well suited for this invention. A representative silane is diethoxydimethyl silane (Aldrich). One of the ethoxy X groups may be coupled to the pigment silanol surface while the other ethoxy is hydrolyzed to attach the R group, e.g., an X group is replaced by an R group. A representative siloxane coupler is dichloro tetramethyl siloxane (Aldrich). Silicon tetrachloride (Dow Corning Z-1228) is an example of a starting silane (where n is 4) that can be used for coupling multiple stabilizer groups and/or fixer groups to pigment surfaces through a common silane group.

In accordance with a specific embodiment disclosed herein, silica can be modified and coated onto a substrate, or silica already coated onto a substrate can be chemically modified, by reacting the silica with one or more organo silanes or siloxanes. The modification reaction of silica is based on known chemistries, and these steps are disclosed in a number of references, including: (1) K. K. Unger, "Porous Silica", *Journal of Chromatography Library*, Vol. 16, pp. 91-95 (1979); and (2) *High Performance Liquid Chromatdgraphy, Advances and Perspectives—Vol.* 2, Csaba Howarth, ed., pp. 134-139 (1980).

In one embodiment, a general formula of the organo silane reagent employed in the modification reaction is $SiR_4$, wherein at least one R group is halogen, preferably Cl; or alkoxy, preferably $C_1$ to $C_3$, and most preferably $C_1$; the halo or alkoxy R group(s) is(are) the groups that react with silanol groups on the silica surface. Of the three (or less) remaining R group(s), at least one R group must be the "active" group, described in greater detail below, and any remaining R group(s) is(are) small alkyl group(s), preferably $C_1$ to $C_3$, and most preferably $C_1$. It is the active R group that imparts the desired properties to the modified silica surface.

Examples of the active R groups can include, but are not limited to: (1) linear or branched alkyl groups up to $C_{22}$, with the linear case represented by the formula $—CH_2—(CH_2)_n—CH_3$, where n is an integer up to 20; (2) (a) cyano, (b) amino, (c) carboxy, (d) sulfonate, (e) halogen, (f) epoxy, (g) furfuryl, (h) pyridyl, and (i) imidazoline derivative-substituted alkyl groups up to $C_8$; (3) cycloalkyl, cycloalkenyl, and epoxycycloalkyl groups up to eight carbon atoms, and their alkyl derivatives; (4) phenyl and phenoxy groups and their alkyl derivatives; (5) (a) amino, (b) carboxy, (c) sulfonate, and (d) halogen substituted counterparts of (4); (6) quaternary amine groups; and (7) mono-ethyleneimine and poly-ethyleneimine groups.

Examples of (1) include ethyl, propyl, and butyl. Examples of (2) include (a) cyanoethyl, cyanopropyl, and cyanobutyl; (b) aminoethyl, aminopropyl, aminobutyl, and combinations such as aminoethylaminopropyl and aminoethylaminobutyl; (f) 5,6-epoxyhexyl; (g) furfurylmethyl; (h) ethylpyridine; and (i) 4,5-dihydroimidazole 3-propyl. Examples of (3) include cyclohexanyl, cylohexenyl, cyclohexenylethyl, cyclopentadienyl, and 3,4-epoxycyclohexylethyl. Examples of (4) include 3-phenoxypropyl and phenoxyphenyl. Examples of (5) include (a) N-phenylaminopropyl and m-aminophenoxypropyl, (b) carboxyphenyl, (c) phenylsulfonate-ethyl, and (d) chlorophenyl. Examples of (6) include N-propyl N,N,N-trimethylammonium-chloride and (2) N-propyl N,N,N-tributylammonium-chloride.

To cite a specific example where silica is the ceramic pigment for use, silica modification can be carried out according to the following general description. The silica is dried in a vacuum at an elevated temperature to remove adsorbed moisture. The dried silica is then allowed to cool down to room temperature. The solvent in which the reaction to modify the silica is carried out is dried with an appropriate drying agent. Common solvents that can be used include toluene, dichloromethane, isopropanol, and methanol. The silica is mixed in the dry solvent; for example, it may be dispersed in the solvent by sonication or high energy mixing. The amount of solvent used should be selected such that the silane reagent concentration (when added) does not generally exceed about 10% of the total solvent.

The vessel containing the silica/solvent mixture may be flushed with dry nitrogen, and then the silane reagent is introduced into the reaction vessel. The amount of reagent added depends on the surface area of the silica and the surface silanol concentration of the silica. When selecting the reaction conditions, one should consider its reactivity. For example, alkoxy silanes are less reactive than the halo silane counterparts. Thus, reaction times and temperatures can be adjusted after considering the reagent used. The determination of such conditions is well within the capability of one skilled in this art. Typically, about six hours or more of refluxing under dry nitrogen is required. If carried out at room temperature rather than at elevated temperatures, longer reactions times may be necessary. Essentially, and as is well-known, the alkoxy or halogen groups react with SiOH groups to form Si—O—C bonds.

After the reaction is completed, the product material can be filtered and washed with excess solvent, and then dried. This general procedure can be carried out to prepare the coating composition for use in accordance with the teachings herein. This reaction may also be carried out without the use of excess reagent, thus eliminating the need to remove excess reagent by washing. Methanol is a preferred solvent; small amounts of it may remain in the product, since it is miscible with water, which is generally used in the subsequent coating step.

As an example, in the preparation of modified silica, about 40 grams of silica to be modified is dried overnight in a vacuum at about 110° C. to remove the adsorbed moisture. The dried silica is then allowed to cool to room temperature. Next, about 500 ml of methanol is dried over calcium sulfate. The dried silica is then mixed in the dried methanol and the silica is dispersed in methanol by sonication. Dry nitrogen is passed in to the reaction vessel at a slow rate to eliminate ambient moisture. The silane reagent is next injected in to the reaction vessel; the reaction mixture may be stirred at ambient temperature or refluxed.

The amount of silane reagent used in the reaction is dependent on the surface area of the silica, the surface silanol concentration of the silica, and the functionality of the reagent. The amount of silane reagent (in grams) needed for complete reaction for a bifunctional silane reagent (i.e., containing two alkoxy or halogen groups) is given by, based on the example in the previous paragraph, $$40\ g \times S m^2/g \times M g/mol \times 8\ \text{micro mol}/m^2 \times 10^6/2$$

where 40 g of silica is modified, S=surface area of silica (in $m^2/g$), M=molecular weight of the silane reagent (in g/mol), and the surface silanol concentration of silica is 8 micro mol/$m^2$. The factor of 2 comes from the assumption that one bifunctional reagent molecule reacts with two silanol groups. The product is filtered. If excess reagent is used, it is removed by washing with dry methanol. In any event, the product is then dried.

Both the combination of the modified silica and print media and the method of the disclosed embodiments solve the challenges in the prior art in that any catalytic activity of the silica surface towards image fade is eliminated by the chemical modification of silica. This improves the image fade and humid fastness properties of the coating. In other words, a friendlier chemical environment is provided for the colorant molecules of the image. The silane modifier interacts with the dye molecules in the ink via Van der Waals forces, thereby improving the humid fastness of the image. In some cases, the unattached end of the modifier carries a functional group (an opposite charge to that of the colorant molecules in some cases) that binds to the dye (colorant) molecules, thereby giving an additional interaction with the dye molecules, resulting in further improvement of humid and water fastness of the image.

Though the above example with respect to silica has been provided, other ceramic pigments and surface coupling reactions are also possible within the context of the present invention. Cyanuric chloride, for example, is highly reactive with alcohols, such as alumina surface hydroxyls or silica surface silanols. Using one of the reactive chlorides to couple to the silica pigment surface, the two remaining reactive chloride groups may be used to attach a stabilizer group, a fixer group, or a combination of the two. Cyanuric chloride provides an acceptable coupling agent because each chlorine has selective reactivity, allowing a predictably uniform reaction product. Coupling through isocyanates, acid chlorides, and organic acids is also provided.

Ceramic pigments have been used in the prior art as part of a coating composition for inorganic porous media. However, such coatings have often required the addition of binder compositions that are used to adhere the composition together. It has further been recognized that the amount of binder that is often used can be greatly reduced by modifying the surface of the alumina particulates. A typical binder that can be used for binding ceramic pigments together as a coating composition is polyvinyl alcohol, though other emulsion polymers can be used. By modification of the surface of the ceramic pigments with one or more modifying groups, less binder can be used. It is believed that the modified ceramic pigments described herein maximize efficiency of added binder-like material by attaching such materials to the surface of the ceramic pigment, thereby reducing the need to include excess or large amounts of binder. One reason the use of less binder may be desirable is because the presence of too much binder in a coating can diminish image quality when printed upon, as too much binder can act to coat the pores that are inherently present on the porous surface of the ceramic pigments. Further, the presence of too much binder in a coating can increase the viscosity of the coating material, thereby making the coating process more challenging. Still further, with any of the above embodiments, because it is by chemical modification of the surface of the ceramic pigments, a relatively uniformly distributed bonded layer can be formed. Therefore, the chemically modified coating does not block the micropores of the original ceramic particulate, and the open pore structure is largely retained.

The modified ceramic pigments disclosed herein can be coated on a media substrate by using any of a number of methods known in the art. For example, the use of an air knife coater, a blade coater, a gate roll coater, a doctor blade, a Meyer rod, a roller, a reverse roller, a gravure coater, a brush applicator, a sprayer, or the like, can be implemented.

By way of another example, FIG. 1 provides a schematic representation 10 of a ceramic pigment modified by both a fixer group 22 and a stabilizer group 20. Specifically, the ceramic pigment particle in this example is silica 12 having surface silanol groups 14, though it could also be alumina or some other ceramic pigment having surface hydroxyl groups. Silicon tetrachloride 16 is also shown, and can be reacted with the silanol group 14 of the silica 12. The silicon tetrachloride can have the general structure $SiR_4$, where the R hydrolyzable group is chlorine and n is 4. In other embodiments, other halogens can be used rather than chlorine, as well as alkoxy groups as described previously. The reaction product of the silanol group 14 and the silicon tetrachloride 16 results in a silane 18 group attached to the silica 12 having three hydrolyzable chloride groups remaining, thereby providing three locations where from 1 to 3 modifying groups can be attached. In the embodiment shown, two of the remaining three chloride groups are reacted with a 2,2,6,6-tetramethyl-4-piperidinol photo-stabilizer 20 through its hydroxyl bonding group. Additionally, one of the remaining three chloride groups is reacted with 5-amino-1-pentanol hydrochloride 22 through its hydroxyl bonding group. The resulting composition 24 comprising two stabilizer groups and one fixer group tethered to silica is shown. In this embodiment, hydrochloric acid is a bi-product of covalent coupling process. Though the stabilizer groups and the fixer group are bound to the ceramic pigment through a common silane spacer group, this is not required.

In the above examples, the surface modified silica can be subsequently incorporated in a binder and coated on a media substrate such as paper. If an anionic dye-containing ink-jet ink is printed on the resulting coated media surface, the anionic dye can be electrostatically attracted to and ionically bound to the cation fixer 22 bound to the silica 12 surface. This attachment can also promote a close association of the fixed dye with the adjacently coupled photo-stabilizers 20. Alternatively to that shown in FIG. 1, each modifying group can be bound to a common ceramic pigment surface directly, or through different silane or siloxane spacer groups, as shown in FIGS. 2 and 3, respectively.

Figure 2:
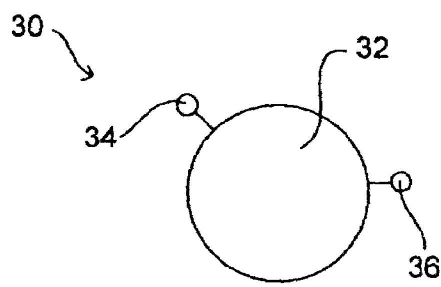
FIG. 2 is a schematic view of a further embodiment of a chemically-modified ceramic pigment.
Figure 3:
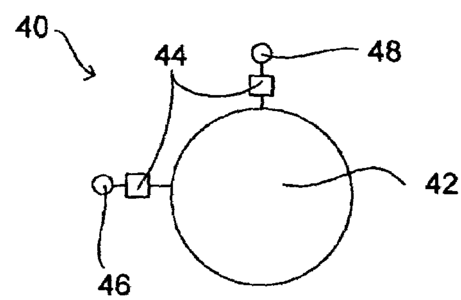
FIG. 3 is a schematic view of yet a further embodiment of a chemically-modified ceramic pigment.

Specifically, with respect to FIG. 2, a chemically-modified ceramic pigment 30 is shown. A ceramic pigment particulate 32, such as an alumina particulate, is shown as chemically modified by a fixer group 34 and a stabilizer group 36. No spacer group is present. Conversely, with FIG. 3, an alternative chemically-modified ceramic pigment 40 is shown. A ceramic pigment particulate 42, such as an organo-metallic particulate, is shown as chemically modified by a fixer group 46 and a stabilizer group 48. In this embodiment, spacer groups 44, such as silanes, siloxanes, or a combination thereof, are shown as present. Alternatively, one modifying group type can be attached to the ceramic pigment directly, and another modifying group type can be attached to the ceramic pigment through a spacer group.

EXAMPLES

The following examples illustrate embodiments of the invention that are presently known. Thus, these examples should not be considered as limitations of the present invention, but are merely in place to teach how to make the best known compositions of the present invention based upon current experimental data. As such, a representative number of compositions and their method of manufacture are disclosed herein.

Example 1

A series of commercially available modified silicas available from Waters, Mass. USA, (where the active group is aminopropyl, cyanopropyl, or octadecyl), including the corresponding unmodified counterpart, used in high performance liquid chromatography, was hand-coated onto photographic substrates, using polyvinyl alcohol as the binder. Lines of cyan, yellow, magenta, and the red, green, blue colors formed by appropriately mixing these primary colors were printed at an initial width of 40 mils. After being allowed to dry, the print samples were allowed to equilibrate at a temperature of 35° C. and 80% relative humidity for four days. The line widths were measured. The Table below shows the increase in line width as a result of exposure to high temperature and humidity. This increase is a measure of humid fastness; the higher the increase, then the poorer the humid bleed performance. It is observed that the modified silica performed much better than the unmodified counterpart.

TABLE 1

Comparison of Humid Fastness of Unmodified and Modified Silicas.

| | Unmodified | Aminopropyl | Cyanopropyl | Octadecyl |
|---|---|---|---|---|
| Cyan | 2.8 | 0.7 | 1.1 | 1.3 |
| Yellow | 16.1 | 3.8 | 6.1 | 5.3 |
| Magenta | 8.6 | 1.9 | 4.8 | 2.3 |
| Red | 17.4 | 3.7 | 7 | 3.5 |
| Green | 8.3 | 1.2 | 3.2 | 1.2 |
| Blue | 21.7 | 3.1 | 8.3 | 5.5 |

Example 2

Silica (Sipernat 310) marketed for ink-jet applications by Degussa Huls, Waterford, N.Y., was modified with the reagent shown below:

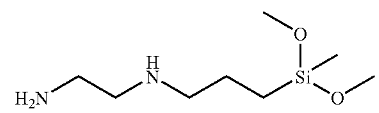

N-(2-aminoethyl)-3-aminopropylmethyidimethoxysilane

The reaction was carried out in dry methanol under dry nitrogen for six hours. Excess reagent was used in the reaction; as such the unreacted reagent was extracted with dry methanol. The product was dried and elemental analysis showed that it has a carbon content of 9%, confirming that indeed the reaction was successfully completed. The product was coated onto a photographic substrate, using polyvinyl alcohol as the binder. Its image fade (light fastness and air fastness) was compared with the unmodified counterpart. For an experimental magenta dye based ink (magentas in general have the poorest image fade), the modified silica had an accelerated light fastness of 28 years; in the same test, the unmodified counterpart had an 11 year light fastness. Likewise, in an accelerated air fade test, the modified silica showed 2 to 3 times improvement relative to the unmodified.

Example 3

Siloxane Coupling of Glucose Photo-Stabilizer to Silica Pigment

A 0.73 g amount of Aerosil 380 silica pigment was dried under vacuum for 3.5 hours at 150° C., cooled to room temperature, and flushed with nitrogen in a flask to void moisture. About 25 mL of dichloromethane solvent was added to the flask containing the silica, stirred to form a slurry, and purged with nitrogen for 10 minutes. To this solution, 0.2 mL of dichloro tetramethyl siloxane (Aldrich) was added, followed by the addition of 0.1 mL of triethylamine. The solution was then continuously stirred for 2.5 hours at room temperature. The resulting solution was centrifuged for 10 minutes and the precipitate washed twice with dichloromethane. The washed precipitate was mixed with 20 mL of dichloromethane solvent to which 0.4 g of D-glucose (Aldrich) and 0.5 mL of triethylamine was subsequently added and stirred overnight at room temperature. The primary alcohol on the glucose was used as a bonding group.

Example 4

Silane Coupling of Glucose Photo-Stabilizer to Silica Pigment

About 20 g of a 20.4% solids aqueous solution of Cabot 021 silica was mixed with 120 mg diethoxydimethylsilane (Aldrich) and 120 mg D-glucose (Aldrich). The reaction mixture was continuously stirred at 75° C. for 2.5 hours.

Example 5

Cyanuric Chloride Coupling of Two (2) Diaminotriazole Photo-Stabilizers to Silica Pigment A 1.83 g amount of Aerosil 90 silica pigment was dried for 3.5 hours at 150° C., cooled to room temperature, and flushed with nitrogen in a flask to void moisture. About 32 mL of dichloromethane solvent was added to the flask containing the silica, stirred to form a slurry, and purged with nitrogen for 10 minutes. To this solution, 0.23 g of cyanuric chloride (Aldrich) and 0.25 mL of triethylamine was added and continuously stirred for 21 hours at room temperature. The resulting solution was centrifuged for 10 minutes and the precipitate washed three times in dichloromethane, and then again in tetrahydrofuran. The resulting solid was added to 35 mL water wherein 0.5 g diaminotriazole photo-stabilizer and 0.5 g potassium carbonate was added. This mixture was continuously stirred at 75° C. for 5 hours, cooled, and washed in water thoroughly. The primary amine on the diaminotriazole was used as a bonding group.

Example 6

Silane Coupling of Three (3) Amine Salt Fixers to Silica Pigment

About 2.0 g of Aerosil silica pigment was dried for 3.5 hours at 150° C., cooled to room temperature, and flushed with nitrogen in a flask to void moisture. About 32 mL of dichloromethane solvent was added to the flask containing the silica, stirred to form a slurry, and purged with nitrogen for 10 minutes. To this solution, 0.5 g of silicon tetrachloride (Aldrich) was added and continuously stirred for 16 hours at room temperature. The resultant slurry was centrifuged for 10 minutes and the precipitate washed twice with 30 mL of dichloromethane. At this point, the silica-reacted silane had three unreacted chlorosilane groups. The silane-treated silica was mixed with 1.0 g 5-amino-1-pentanol hydrochloride (prepared by neutralizing 5-amino-1-pentanol with hydrochloric acid) in 25 mL dichloromethane. The reaction mixture was stirred at 50° C. for 6 hours, cooled to room temperature, and washed twice with 25 mL dichloromethane.

Example 7

Silane Coupling of Two (2) Amine Salt Fixers and One (1) Diaminotriazole Photo-Stabilizer to Silica Pigment About 2.0 g of Aerosil silica pigment as dried for 3.5 hours at 150° C., cooled to room temperature, and flushed with nitrogen in a flask to void moisture. About 32 mL of dichloromethane solvent was added to the flask containing the silica, stirred to form a slurry, and purged with nitrogen for 10 minutes. To this solution, 0.50 g of silicon tetrachloride (Aldrich) was added and continuously stirred for 16 hours at room temperature. The resultant slurry was centrifuged for 10 minutes and the precipitate washed twice with 30 mL of dichloromethane. At this point, the silica reacted silane had three unreacted chlorosilane groups. The silane treated silica was mixed with 1.0 g 5-amino-1-pentanol hydrochloride (prepared by neutralizing 5-amino-1-pentanol with hydrochloric acid) and 1.0 g diaminotriazole in 25 mL dichloromethane. The reaction mixture was stirred at 50° C. for 6 hours, cooled to room temperature, and washed twice with 25 mL dichloromethane.

While the invention has been described with reference to certain preferred embodiments, those skilled in the art will appreciate that various modifications, changes, omissions, and substitutions can be made without departing from the spirit of the invention. It is therefore intended that the invention be limited only by the scope of the appended claims.

INDUSTRIAL APPLICABILITY

The chemically-modified ceramic pigments disclosed herein is expected to find use in the production of imaging media.

What is claimed is:

1. A method of enhancing image permanence of ink-jet images printed on ink-jet media, comprising:

(a) modifying a surface of a ceramic pigment with a modifying group including a fixer group and a photo-stabilizer group;

(b) coating a media substrate with the ceramic pigment to form a coated media substrate; and (c) ink-jetting an ink-jet ink in the form of an image on the coated media substrate, wherein a composition of the ink-jet ink is interactive with at least one modifying group, thereby providing enhanced image permanence;

wherein the modifying group is attached to the ceramic pigment surface through a spacer group selected from a silane group, a siloxane group and a combination thereof;

wherein the fixer group includes 5-amino-1-pentanol hydrochloride;

and wherein the photo-stabilizer group includes 2,2,6,6-tetramethyl-4-piperidinol photo-stabilizer.

2. A method as in claim 1, wherein the ceramic pigment comprises silica.

3. A method as in claim 1, wherein the ceramic pigment comprises alumina.

4. A method as in claim 1, wherein the ceramic pigment comprises titania or zirconia.

5. A method as in claim 1, wherein the ceramic pigment comprises an organic-metallic material.

6. A method as in claim 1, wherein the ceramic pigment is modified by at least two different modifying groups.

7. A method as in claim 6, wherein the multiple modifying groups include at least one fixer and at least one photo-stabilizer.

8. A method as in claim 1, wherein the modifying group further includes a cationic fixer ligand selected from the group consisting of primary amines, secondary amines, tertiary amines, polyamines, quaternary ammoniums, and alkali earth metals.

9. A method as in claim 1, wherein the modifying group further includes an anionic fixer group selected from the group consisting of carboxylates and sulfonates.

10. A method as in claim 1, wherein the modifying group further includes a stabilizer group selected from the group consisting of free radical quenchers, anti-oxidants, anti-ozonants, and photon energy absorbers.

11. A method as in claim 1, wherein the modifying group further includes a stabilizer group selected from the group consisting of phenols, substituted phenols, amines, alcohols, polyols, sugars, sugar derivatives, hydroxyamines, amine-oxides, sulfur-containing inorganic salts, amides, polyamides, urea, sulfur-containing heterocyclics, nitrogen-containing heterocyclics, sulfur- and nitrogen-containing heterocyclics, organic acids, and combinations thereof.

12. A method as in claim 1, wherein the coating step occurs after the modifying step.

13. A method as in claim 1, wherein the modifying step occurs after the coating step.

14. A system for producing permanent ink-jet ink images, comprising:

(a) a media substrate, having a porous coating coated thereon, said porous coating comprising a modified ceramic pigment, the ceramic pigment being modified with a covalently-attached modifying group including a fixer group and a photo-stabilizer group; and (b) an ink-jet ink comprising a composition configured for interacting with the modifying group portion of the modified ceramic pigment upon printing the ink-jet ink onto the porous coating;

wherein the modifying group is attached to the ceramic pigment surface through a spacer group selected from a silane group, a siloxane group and a combination thereof;

wherein the fixer group includes 5-amino-1-pentanol hydrochloride;

and wherein the photo-stabilizer group includes 2,2,6,6-tetramethyl-4-piperidinol photo-stabilizer.

15. A system as in claim 14, wherein the composition is an anionic dye.

16. A system as in claim 15, wherein the modified ceramic pigment further includes a cationic fixer group covalently attached to the ceramic pigment.

* * * * *